May 22, 1934.  S. ROKOSZ  1,960,167
PISTON AND POWER SHAFT CONNECTING GEARING
Filed Sept. 15, 1933
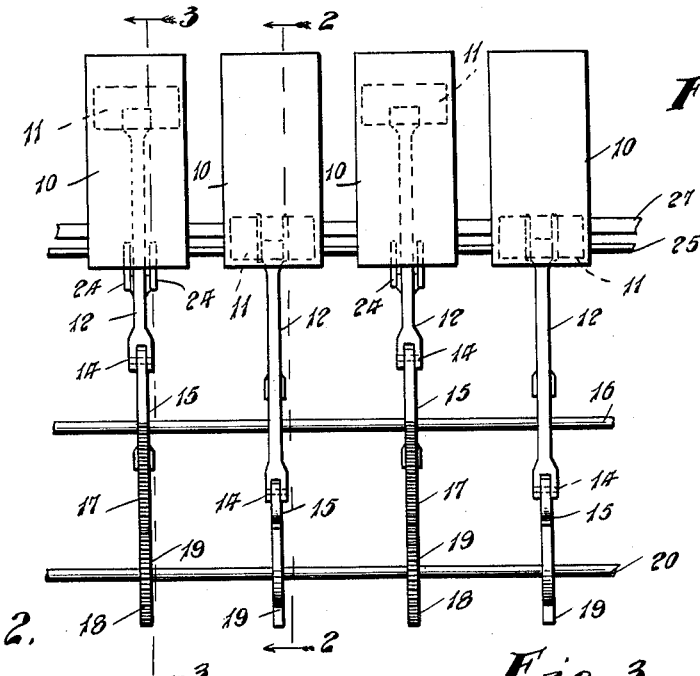
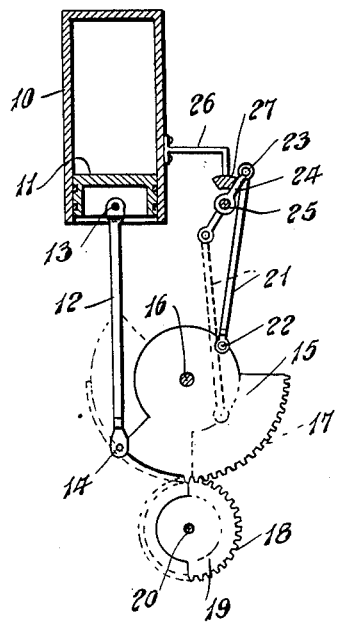
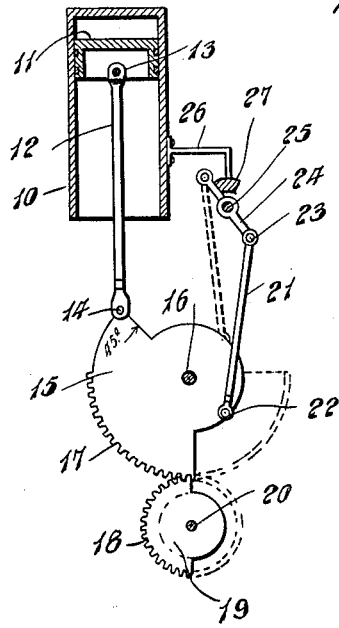
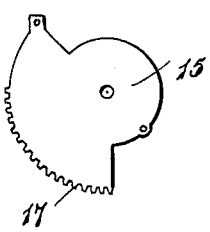
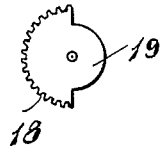
Inventor
S. Rokosz.
By L. F. Kendrick Jr.
Attorney Patented May 22, 1934

1,960,167

UNITED STATES PATENT OFFICE 1,960,167

PISTON AND POWER SHAFT CONNECTING GEARING

Stanley Rokosz, Hazleton, Pa.

Application September 15, 1933, Serial No. 689,630

4 Claims. (Cl. 74—14)

This invention relates to toothed gearing or drive means primarily adapted for use between a piston and power shaft in an internal combustion engine, reciprocating engine or elsewhere, where the principles of the invention are capable of utilization.

It is primarily aimed to provide a novel construction eliminating dead centers and enabling attainment of more uniform piston velocities, effecting a decrease of the angular motion of the connecting rod resulting in decrease of the side thrust of the pistons and therefore a decrease of frictional power losses in the cylinders, as well as a decrease in wear of the pistons and cylinders.

The more specific objects and advantages will become apparent from a consideration of the description following taken in connection with accompanying drawing illustrating an operative embodiment.

In said drawing:—

Figure 1 is a fragmentary view in side elevation of engine parts employing my improvement, Figure 2 is a vertical sectional view taken on the line 2—2 of Figure 1, Figure 3 is a vertical sectional view taken on the line 3—3 of Figure 1, Figure 4 is a detail side elevation of the larger mutilated gear, and Figure 5 is a side elevation of the smaller mutilated gear.

Referring specifically to the drawing, the invention may be used in connection with either a single or multiple cylinder engine of the internal combustion type, fluid pressure type or otherwise. In said drawing, cylinders are shown at 10 being of any desired number within which pistons 11 are reciprocable. It is to be understood that the showing of the cylinders 10 and pistons 11 is diagrammatic since the invention may be used with any engine cylinders and pistons. Connecting rods 12 are pivoted at 13 to the pistons 11. Said connecting rods 12 are also pivoted as at 14 to mutilated gear wheels or segments 15 journaled on a fixed shaft or arbor 16. Said mutilated gear 15 to the extent of ninety degrees has teeth 17 which begin at forty-five degrees from a line radially of the axis 16 passing through the pivot 14. The teeth 17 are enmeshed with teeth 18 extending one-hundred and eighty degrees about a pinion or mutilated gear 19 carried by a driven shaft 20.

A link 21 is pivoted at 22 to the mutilated gear wheel 15 and at 23 is pivoted to a lever or second link 24 in turn pivoted at 25 on a bracket 26 or the like extending one from each cylinder. The brackets 26 carry stops or abutments 27 engageable by the levers or links 24.

In the operation of the engine, each cylinder, piston and associated mechanism in proper sequence operates as follows. The connecting rod on the power stroke of the piston 11 swings the mutilated gear wheel 15, causing the teeth 17 and 18 to rotate mutilated gear 19 one-hundred and eighty degrees, thus turning the driven shaft one-hundred and eighty degrees, the link 21 during this movement having moved the link 24 into engagement with the stops 27. The part of each unit will be restored to initial position through the successive operations of the other units.

The stops 27 and their engagement by the links 24 are employed primarily as guides to limit the movement of the mutilated gears 15 to exactly ninety degrees.

Various changes may be resorted to provided they fall within the spirit and scope of the invention.

I claim as my invention:—

1. In combination with a piston and connecting rod therefor and a driven shaft, enmeshed mutilated gears, one of said gears being on said driven shaft, means pivotally connecting the other gear to the connecting rod, stop means to limit the movement of the gear connected to the connecting rod, and means actuating the stop means connected to the last mentioned gear on the opposite side of its axis to the connection of the connecting rod.

2. In combination with a piston and connecting rod therefor and a driven shaft, enmeshed mutilated gears, one of said gears being on said driven shaft, means pivotally connecting the other gear to the connecting rod, stop means to limit the movement of the gear connected to the connecting rod comprising a stop member, a lever engageable with the stop member, linkage connecting the lever to the same gear as the connecting rod, and on the opposite side of the axis of the latter gear to the connecting rod.

3. In combination with a piston and connecting rod therefor and a driven shaft, enmeshed mutilated gears, one of said gears being on said driven shaft, means pivotally connecting the other gear to the connecting rod, the last mentioned gear having teeth to the extent of ninety degrees commencing forty-five degrees from the connection of the connecting rod thereto, the other gear having teeth to the extent of one-hundred and eighty degrees, and stop means to limit the movement of the gear connected to the connecting rod.

4. In combination with a piston and connecting rod therefor and a driven shaft, enmeshed mutilated gears, one of said gears being on said driven shaft, means pivotally connecting the other gear to the connecting rod, the last mentioned gear having teeth to the extent of ninety degrees commencing forty-five degrees from the connection of the connecting rod thereto, the other gear having teeth to the extent of one-hundred and eighty degrees, stop means to limit the movement of the gear connected to the connecting rod comprising a stop member, a lever engageable with the stop member, and linkage connecting the lever to the same gear as the connecting rod.

STANLEY ROKOSZ.